J. M. GOLDBERG.
RESILIENT OR CUSHION WHEEL.
APPLICATION FILED APR. 7, 1914.

1,129,480.

Patented Feb. 23, 1915.
2 SHEETS—SHEET 1.

J. M. Goldberg, Inventor

Witnesses

J. M. GOLDBERG.
RESILIENT OR CUSHION WHEEL.
APPLICATION FILED APR. 7, 1914.

1,129,480.

Patented Feb. 23, 1915.
2 SHEETS—SHEET 2.

J. M. Goldberg, Inventor

Witnesses

UNITED STATES PATENT OFFICE.

JOSEPH M. GOLDBERG, OF ALEXANDRIA, LOUISIANA.

RESILIENT OR CUSHION WHEEL.

1,129,480.

Specification of Letters Patent. Patented Feb. 23, 1915.

Application filed April 7, 1914. Serial No. 830,183.

*To all whom it may concern:*

Be it known that I, JOSEPH M. GOLDBERG, a citizen of the United States, residing at Alexandria, in the parish of Rapides and State of Louisiana, have invented certain new and useful Improvements in Resilient or Cushion Wheels; and I do hereby declare the following to be a full, clear, and exact description of the invention, such as will enable others skilled in the art to which it appertains to make and use the same.

This invention relates to wheels and more particularly to resilient wheels, and has for one of its objects the construction of a wheel resiliently mounted upon the axle in a manner to obviate the necessity of the use of cushion tires.

A further object of this invention resides in the construction of the resilient mounting of the wheel whereby the parts thereof are readily accessible, and may be readily removed for the purpose of repairs without the necessity of disassembling the entire structure.

A still further object of this invention resides in the construction of a resilient mounting for wheels to prevent the ingress of dirt, grit, etc., into the working parts of the wheel, thus prolonging the life of the mounting. And a still further object of this invention resides in the construction of a resilient mounting for wheels consisting of few parts, easy to repair, efficient and durable in purpose and which may be manufactured and maintained at a nominal cost.

Figure 1:
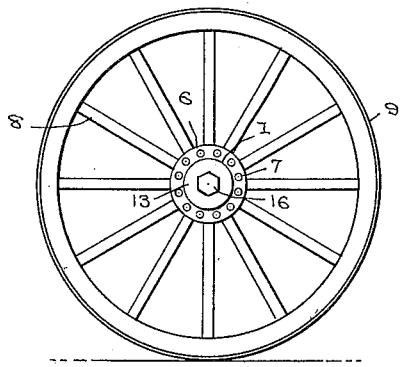
Figure 3:
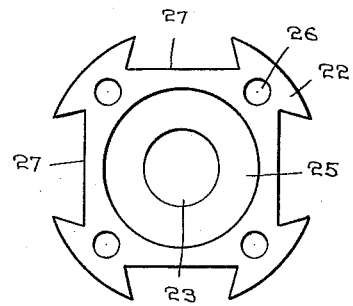
Figure 2:
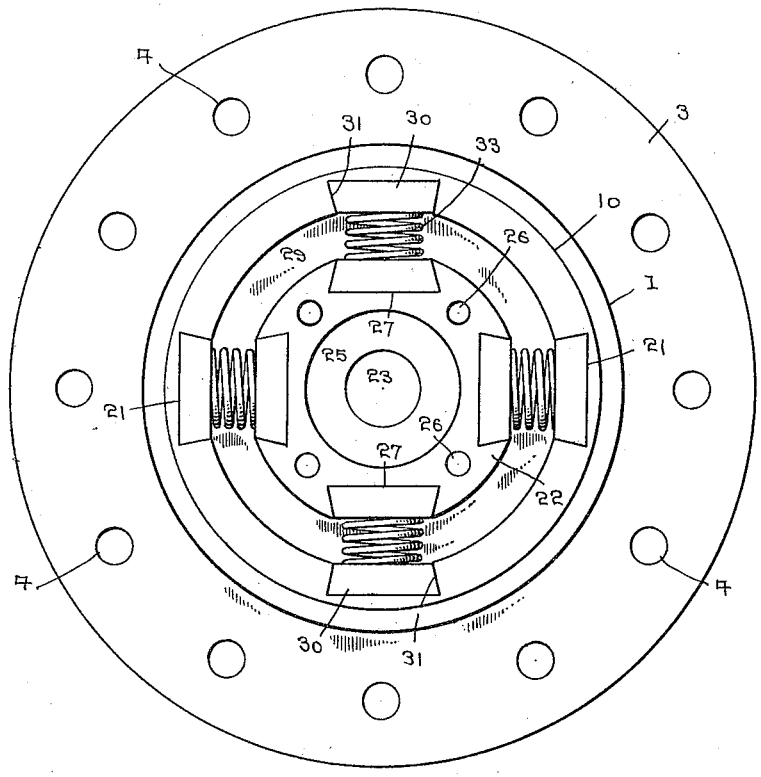
Figure 4:
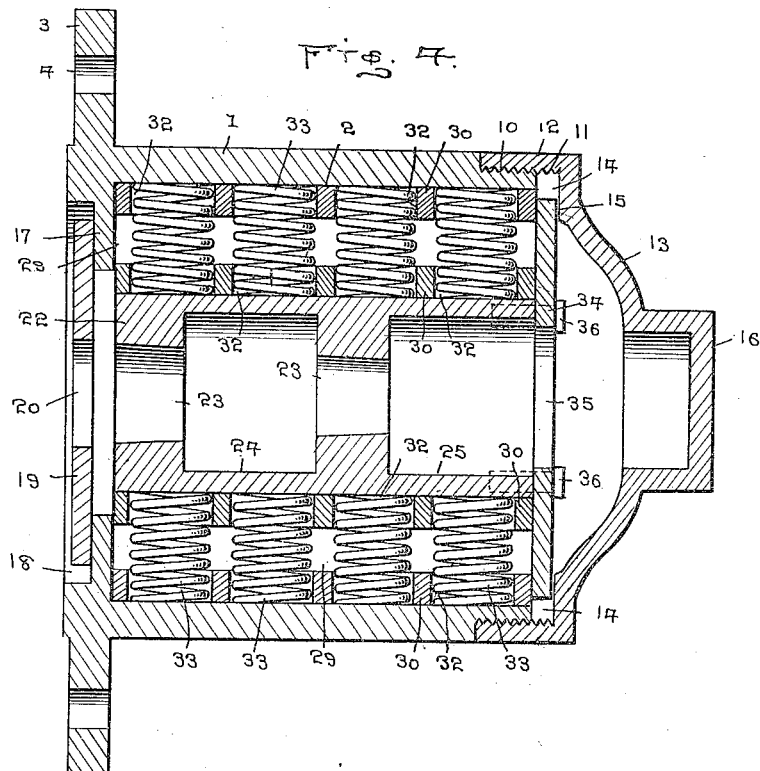
Figure 5:
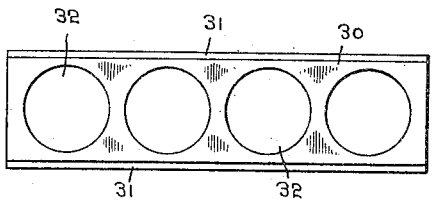
Figure 6:

These and other objects will more fully appear and the nature of the invention more clearly understood by the construction, combination and arrangement of the parts thereof as described in the following specification, defined in the appended claim and illustrated in the accompanying drawings, in which, Figure 1 is a front view of one of the wheels in accordance with this invention and showing the same in complete form ready for use. Fig. 2 is a front view of the hub construction with the cap and front washer removed showing the manner of assembling the parts constituting the resilient mounting. Fig. 3 is a front end view of the boxing arranged within the interior of the hub showing the same provided with the dovetailed grooves. Fig. 4 is a vertical longitudinal section through the hub of the wheel showing the parts of the resilient mounting and the means for seating the same between the hub and the boxing centrally arranged therein, and the means for retaining the parts in assembled relation. Fig. 5 is a top plan view of one of the spring cage strips used in connection with this invention, and Fig. 6 is an edge view of the spring cage strips shown in Fig. 5.

Referring to the drawings 1 denotes the hub of the wheel provided with the bore 2 and further provided with the annular flange 3 at the rear end thereof, the flange 3 being provided with a plurality of apertures 4, and arranged upon the hub 1 is the retaining ring 6 provided with apertures for registering with the apertures 4 of the flange 3 and connected together by rivets or other suitable connections 7 for retaining therebetween the spokes 8 of the wheel 9 as shown in Fig. 1, however, any suitable and desirable means of securing the spokes upon the hub may be resorted to. Upon the front end of the hub 1 is provided the screw threads 10 for receiving the threads 11 of the annular flange 12 of the cap 13, the threads 10 being shorter than the threads 11 of the cap 13 to provide the annular space 14 between the front end of the hub 1 and the annular shoulder or guide 15 of the cap 13, the cap 13 being further provided with the head 16 for covering the retaining nut upon the axle.

Adjacent the rear end of the hub 1 and within the bore 2 thereof is the annular flange 17 being sufficiently removed from the rear edge of the end of the hub 1 to provide the annular recess 18 in which recess the washer 19 is adapted to be seated, the washer 19 being provided with the central aperture 20 for the passage of the axle therethrough. Within the inner wall of the bore 2 of the hub 1 is formed a plurality of transversely extending dovetailed grooves 21, any number of these grooves being used as deemed necessary.

Arranged within the bore 2 of the hub 1 is the boxing 22, the boxing 22 being provided with the central bore 23 through which the axle passes, the bore 23 being provided with the counter bores 24 and 25, these counter bores being designed to receive roller bearings if desired. The boxing 22 has arranged in the front end thereof a plurality of internal threaded sockets 26, and upon the periphery of the boxing 22 is also formed a plurality of transversely extending dovetailed recesses 27. The boxing 22 being of less diameter than the diameter of the bore 2 of the hub 1 there is provided the annular space 29 this space providing for the radial movement of the hub 1 relative to the boxing 22.

Arranged within the dovetailed grooves 21 of the hub 1 and the dovetailed grooves 27 of the boxing 22 are the spring cages, each spring-cage comprises a pair of elongated strips 30, having inclined or beveled edges adapted to fit snugly into dove-tailed grooves provided in the inner face of the hub 1 and also in the coöperating face of the boxing 22, said strips also having a plurality of apertures 32 extending through the said strips to receive the ends of the said springs. In construction the required number of springs to fill the apertures in a strip are placed in the apertures, one strip at each end of the springs and then the strips are slipped into their respective grooves, one strip in a groove in the boxing and the other in the complementary groove in the hub which is immediately adjacent thereto, the dove-tail groove preventing the strips from falling from their seats in the grooves, and the surface of the grooves retaining the springs in their respective apertures. The number of spring-cages used in a hub equals the number of dove-tailed grooves provided in the hub 1 of the wheel; a plurality of spring cage strips, having beveled edges, are used in the formation of the spring cages, the said spring cage strips 30 also being provided with a plurality of apertures 32, which apertures are in registration with the apertures of each of the opposing cages 30 and in these apertures are seated the compression springs 33, said springs 33 being positioned within the space 29 formed between the boxing 22 and the interior wall of the bore 2 of the hub 1.

For retaining the spring cages 30 and the compression springs 33 in their respective operative positions, the outer washer 34 is provided, this washer having the central aperture 35 formed therein for the passage of the end of the axle therethrough and having also formed adjacent the periphery of the washer 34 suitable apertures for registering with the screw threaded sockets 26 of the boxing 22, the washer 34 being secured to the boxing 22 through the medium of the screws 36 or other suitable connections.

It will therefore be seen that this invention provides a resilient mounting for wheels of a superior nature, whereby the boxing 22 being revolubly mounted upon the axle of the vehicle and retained thereon by the usual nut, the flange of which bears against the exterior of the washer 34 and being sealed by the cap 13, the cap 13 also having the function to provide a guide way for the washer 34 during the radial movement of the hub 1 relative to the boxing 22, and also the flange 17 of the hub 1 is designed to travel between the ends of the spring cages 30 and the boxing 22 and the rear washer 19, this washer being provided as a dust guard for preventing the ingress of grit or other deleterious substances into the interior of the hub, thus prolonging the life of the parts constituting the resilient mounting therein, and further by the mounting of the parts in the manner described the same may be readily repaired without the necessity of utterly disassembling the wheel construction, and this is a very important factor in structures of this character.

While I have here shown and described the preferred embodiment of my invention, I hereby reserve the right to make such alterations and variations therein from time to time as I may deem expedient and which will neither depart from the spirit of the invention nor conflict with the scope of the claim.

Having thus fully described my invention, what I claim as new and desire to secure by Letters Patent of the United States is:

A hub comprising an outer casing or hub proper; a boxing having a spindle bore, mounted within said casing whereby an annular space will be provided between the said casing and boxing, the said casing and boxing having transversely extending grooves directly opposite each other; a plurality of springs arranged in alined groups; apertured plates adapted to receive the ends of said springs, said plates being designed to fit in the registering grooves in said boxing and casing, and means to hold the said parts in operative relationship to each other.

In testimony whereof I have signed my name to this specification in the presence of two subscribing witnesses.

JOS. M. GOLDBERG.

Witnesses:
 GEO. A. ROBERTS,
 J. M. S. WHITTINGTON.

Copies of this patent may be obtained for five cents each, by addressing the "Commissioner of Patents. Washington, D. C."